United States Patent
Lee et al.

(10) Patent No.: US 8,891,130 B2
(45) Date of Patent: Nov. 18, 2014

(54) PRINT CONTROL TERMINAL DEVICE, IMAGE FORMING APPARATUS, PRINT CONTROL METHOD, AND IMAGE FORMING METHOD

(71) Applicant: Samsung Electronics Co., Ltd., Suwon-si (KR)

(72) Inventors: Sung-myun Lee, Seoul (KR); Jin-tae Chung, Gunpo (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 77 days.

(21) Appl. No.: 13/661,525

(22) Filed: Oct. 26, 2012

(65) Prior Publication Data
US 2013/0107295 A1    May 2, 2013

(30) Foreign Application Priority Data
Oct. 27, 2011  (KR) .................. 10-2011-0110584

(51) Int. Cl.
*G06F 15/00*  (2006.01)
*G06F 3/12*  (2006.01)
*G06K 15/00*  (2006.01)

(52) U.S. Cl.
CPC ............ *G06F 3/1208* (2013.01); *G06F 3/1247* (2013.01); *G06F 3/1285* (2013.01)
USPC .......... 358/1.9; 358/1.13; 358/1.15; 358/1.18

(58) Field of Classification Search
USPC .......... 358/1.9, 3.2, 3.06, 3.1, 1.13, 1.1, 1.15, 358/1.18; 715/767, 768, 202; 345/179, 173
See application file for complete search history.

(56) References Cited

U.S. PATENT DOCUMENTS

2013/0321870 A1*  12/2013  Hahm et al. .................. 358/3.2

* cited by examiner

*Primary Examiner* — Charlotte M Baker
(74) *Attorney, Agent, or Firm* — Staas & Halsey LLP

(57) ABSTRACT

A print control terminal device, which is connected to an image forming apparatus, includes: a User Interface (UI) unit which receives a print command for a target document; a printer driver unit which detects a transparency region, which is a region to which transparency is applied, from the target document by analyzing one or more rendering commands for each object included in the target document, and generates print data by inserting transparency information into pixel data corresponding to the detected transparency region; and a communication interface unit which transmits the generated print data to the image forming apparatus.

21 Claims, 13 Drawing Sheets
(1 of 13 Drawing Sheet(s) Filed in Color)

FIG. 4

- R1 command -
1.1. ROP : 0xF0 (Destination = Brush)
1.2. Brush : 0xFF0000(Blue)
1.3. Draw Rectangle

- R2 command -
1.4. ROP :0xF0 (Destination = Brush)
1.5. Brush : 0x00FFFF(Yellow)
1.6. Draw Rectangle

FIG. 5

- R3 command -
2.1. ROP : 0xF0 (Destination = Brush)
2.2. Brush : 0xFF0000(Blue)
2.3. Draw Rectangle

- R4 command -
2.4. ROP : 0x5A (Destination = Destination XOR Brush)
2.5. Brush : 0x00FFFF (Yellow)
2.6. Draw Rectangle 2.7. ROP : 0xA0 (Destination = Destination AND Destination)
2.8. Brush : Pattern Brush
2.9. Draw Rectangle 2.10. ROP : 0x5A (Destination = Destination XOR Brush)
2.11. Brush : 0x00FFFF (Yellow)
2.12. Draw Rectangle

FIG. 10

| Object value | Object | Comment |
|---|---|---|
| 00000001 | Image object | |
| 01000001 | Image object | |
| 10000001 | Image object | |
| 11000001 | Transparency Image object | 11xxxxxx Transparency object |
| 00000010 | Graphic object | |
| 01000010 | Graphic object | |
| 10000010 | Graphic object | |
| 11000010 | Transparency Graphic object | 11xxxxxx Transparency object |

←%-12345X@PJL COMMENT PCL XL Driver
@PJL COMMENT USERNAME="System"
@PJL COMMENT DOCNAME="Test.doc"
@PJL JOB NAME="Test.doc"
@PJL SET COLORMODE=COLOR
@PJL SET RESOLUTION=600
@PJL SET PAPERTYPE=OFF
@PJL SET BANNERSHEET=OFF
@PJL SET DARKENTEXT=ON
@PJL SET ENHANCETRANSPARENCY=ON ~1210
@PJL ENTER LANGUAGE=PCLXL

PRINT CONTROL TERMINAL DEVICE, IMAGE FORMING APPARATUS, PRINT CONTROL METHOD, AND IMAGE FORMING METHOD

CROSS-REFERENCE TO RELATED APPLICATIONS

This application claims priority benefit under 35 U.S.C. §119 from Korean Patent Application No. 10-2011-0110584, filed on Oct. 27, 2011, in the Korean Intellectual Property Office, the disclosure of which is incorporated herein by reference in its entirety.

BACKGROUND

1. Field

Apparatuses and methods consistent with the following disclosure relate to a print control terminal device, an image forming apparatus, a print control method, and an image forming method, and more particularly, to a print control terminal device, an image forming apparatus, a print control method, and an image forming method which can easily determine whether a document or print data includes any transparency object.

2. Description of the Related Art

Image forming apparatuses are devices for printing print data generated by terminal devices, such as, computers or the like, on recording paper. Examples of the image forming apparatuses include a copier, a printer, a facsimile machine, a multi-functional peripheral (MFP) device, and the like.

Users may apply various effects to documents by using various application programs. A transparency function, which is one of the various effects, is widely used for its benefits in decorating documents. However, documents with transparency may often not be printed as clearly as they appear on the screen.

More specifically, a transparency pattern may be used to apply transparency to a document. However, in a case in which different transparency patterns are applied to objects having the same transparency level, a color aberration may occur, as shown in FIG. 6.

To prevent the occurrence of a color aberration in connection with the application of a transparency pattern, a transparency pattern may be magnified by a predetermined transparency multiple number. However, a particular combination of a transparency multiple number and a half-toning screen may cause degradation in picture quality, and this problem is further described with reference to FIGS. 7A and 7B.

FIG. 7A is a diagram showing an example of a printed document obtained by applying a transparency level of 50% and a transparency multiple number of (1*1), and FIG. 7B is a diagram showing an example of a printed document obtained by applying a transparency level of 50% and a transparency multiple number of (4*4).

Referring to FIGS. 7A and 7B, the less the transparency multiple number, the more likely a color aberration is to occur. Alternatively, the greater the transparency multiple number, the more likely a degradation in picture quality, such as, unwanted stripes is to occur.

To prevent any degradation in picture quality that may result from the application of transparency, various algorithms have been suggested. These algorithms, however, are often difficult to be applied to an actual printing process because it is generally difficult to determine transparency during a printing process. Accordingly, these algorithms may be executed only by a user setting.

More specifically, in an environment where a device driver interface (DDI) command is transmitted from a Graphics Device Interface (GDI) of a Microsoft Operating System (OS) to a printer driver, as illustrated in FIG. 16, no transparency attributes are defined for objects that are transmitted.

For example, to define transparency by using Printer Command Language (PCL) 6, which is one of the most widely used printer languages, several rendering commands may be required. Since these rendering commands may also be used for various purposes other than transparency, transparency may be configured to be realized on a final output image in response to a particular combination of these rendering commands. Accordingly, it is difficult to determine whether transparency is set in print data during a printing process.

SUMMARY

Additional aspects and/or advantages will be set forth in part in the description which follows and, in part, will be apparent from the description, or may be learned by practice of the following disclosure.

Exemplary embodiments address at least the above problems and/or disadvantages and other disadvantages not described above. In addition, the exemplary embodiments are not required to overcome the disadvantages described above, and an exemplary embodiment may overcome other problems, not described above.

The exemplary embodiments provide a print control terminal device, an image forming apparatus, a print control method, and an image forming method which can easily determine whether a document or print data includes any transparency object.

According to an aspect of the exemplary embodiments, there is provided a print control terminal device which is connected to an image forming apparatus, the print control terminal device including: a User Interface (UI) unit which receives a print command for a target document; a printer driver unit which detects a transparency region, which is a region to which transparency is applied, from the target document by analyzing one or more rendering commands for each object included in the target document, and generates print data by inserting transparency information into pixel data corresponding to the detected transparency region; and a communication interface unit which transmits the generated print data to the image forming apparatus.

The printer driver unit may include: a renderer which performs rendering based on the one or more rendering commands; a transparency detector which detects a region for which a predefined combination of rendering commands is input as the transparency region; and a print data generator which generates the print data by inserting the transparency information into pixel data corresponding to the detected region.

The transparency detector may detect a region for which an XOR rendering command, an AND rendering command, and an XOR rendering command are sequentially input as the transparency region.

If an input XOR rendering command is received during a rendering operation for a target pixel and a value of the target pixel includes information indicating that an XOR rendering command and an AND rendering command have been sequentially executed on the target pixel, the print driver unit may add information indicating that the target pixel corresponds to a transparency object to the value of the target pixel. If the input XOR rendering command is received during the rendering operation for a target pixel and the value of the target pixel does not include the information indicating that an XOR rendering command and an AND rendering command have been sequentially executed on the target pixel, the print driver unit may add information indicating that the input XOR rendering command has been executed on the target pixel to the value of the target pixel. If an input AND rendering command is received during the rendering operation for the target pixel and the value of the target pixel includes information indicating that an XOR rendering command has been executed on the target pixel, the print driver unit may add information indicating that an XOR rendering command and the input AND rendering command have been executed on the target pixel to the value of the target pixel. If the input AND rendering command is received during the rendering operation for the target pixel and the value of the target pixel does not include the information indicating that an XOR rendering command has been executed on the target pixel, the print driver unit may add information indicating that a predefined combination of rendering commands has not yet been executed on the target pixel to the value of the target pixel. If a rendering command other than an XOR rendering command and an AND rendering command is received during the rendering operation for the target pixel, the print driver unit may add the information indicating that the predefined combination of rendering commands has not yet been executed on the target pixel to the value of the target pixel.

The value of the target pixel may include a first field representing a red (R) value, a second field representing a green (G) value, a third field representing a blue (B) value, and a fourth field representing object attribute information, and the fourth field may include a sub-field indicating whether the target pixel corresponds to a transparency object.

The fourth field may include a sub-field which is six bits long and indicates an object type corresponding to the target pixel and a sub-field which is two bits long and indicates whether the target pixel corresponds to a transparency object.

If the generated print data has transparency, the communication interface unit may transmit information indicating the presence of transparency in the generated print data to the image forming apparatus as a Printer Job Language (PJL) command.

According to another aspect of the exemplary embodiments, there is provided an image forming apparatus which is connected to a print control terminal device, the image forming apparatus including: a communication interface unit which receives print data; a rendering unit which renders the received print data based on one or more rendering commands for each object included in the received print data; a transparency detection unit which detects a region for which a predefined combination of rendering commands is input from the rendered print data as a transparency region; and an image forming unit which prints the rendered print data by applying a predefined picture quality improving algorithm to the detected transparency region.

The transparency detection unit may detect a region for which an XOR rendering command, an AND rendering command, and an XOR rendering command are sequentially input as the transparency region.

The picture quality improving algorithm may be an algorithm for half-toning the rendered print data by using a half-toning screen corresponding to a transparency multiple number applied to the detected transparency region.

According to another aspect of the exemplary embodiments, there is provided a print control method of a print control terminal device which is connected to an image forming apparatus, the print control method including: receiving a print command for a target document; detecting a transparency region, which is a region to which transparency is applied, from the target document by analyzing one or more rendering commands for each object included in the target document, and generating print data by inserting transparency information into pixel data corresponding to the detected transparency region; and transmitting the generated print data to the image forming apparatus.

The generating the print data may include: performing rendering based on the one or more rendering commands; detecting a region for which a predefined combination of rendering commands is input as the transparency region; and generating the print data by inserting the transparency information into pixel data corresponding to the detected region.

The detecting the transparency region may include detecting a region for which an XOR rendering command, an AND rendering command, and an XOR rendering command are sequentially input as the transparency region.

The generating the print data may include: if an input XOR rendering command is received during a rendering operation for a target pixel and a value of the target pixel includes information indicating that an XOR rendering command and an AND rendering command have been sequentially executed on the target pixel, adding information indicating that the target pixel corresponds to a transparency object to the value of the target pixel; if the input XOR rendering command is received during the rendering operation for a target pixel and the value of the target pixel does not include the information indicating that an XOR rendering command and an AND rendering command have been sequentially executed on the target pixel, adding information indicating that the input XOR rendering command has been executed on the target pixel to the value of the target pixel; if an input AND rendering command is received during the rendering operation for the target pixel and the value of the target pixel includes information indicating that an XOR rendering command has been executed on the target pixel, adding information indicating that an XOR rendering command and the input AND rendering command have been executed on the target pixel to the value of the target pixel; if the input AND rendering command is received during the rendering operation for the target pixel and the value of the target pixel does not include the information indicating that an XOR rendering command has been executed on the target pixel, adding information indicating that a predefined combination of rendering commands has not yet been executed on the target pixel to the value of the target pixel; and if a rendering command other than an XOR rendering command and an AND rendering command is received during the rendering operation for the target pixel, adding the information indicating that the predefined combination of rendering commands has not yet been executed on the target pixel to the value of the target pixel.

The value of the target pixel may include a first field representing a red (R) value, a second field representing a green (G) value, a third field representing a blue (B) value, and a fourth field representing object attribute information, and the fourth field may include a sub-field indicating whether the target pixel corresponds to a transparency object.

The fourth field may include a sub-field which is six bits long and indicates an object type corresponding to the target pixel and a sub-field which is two bits long and indicates whether the target pixel corresponds to a transparency object.

The transmitting the generated print data may include, if the generated print data has transparency, transmitting information indicating the presence of transparency in the generated print data to the image forming apparatus as a Printer Job Language (PJL) command.

According to another aspect of the exemplary embodiments, there is provided a print control method of an image forming apparatus which is connected to a print control terminal device, the print control method including: receiving print data; rendering the received print data based on one or more rendering commands for each object included in the received print data; detecting a region for which a predefined combination of rendering commands is input from the received print data as a transparency region; and printing the rendered print data by applying a predefined picture quality improving algorithm to the detected transparency region.

The detecting the transparency region may include detecting a region for which an XOR rendering command, an AND rendering command, and an XOR rendering command are sequentially input as the transparency region.

The picture quality improving algorithm may be an algorithm for half-toning the rendered print data by using a half-toning screen corresponding to a transparency multiple number applied to the detected transparency region.

According to another aspect of the exemplary embodiments, there is provided a computer-readable recording medium having recorded thereon a program for executing a print control method of a print control terminal device which is connected to an image forming apparatus, the print control method including: receiving a print command for a target document; detecting a transparency region, which is a region to which transparency is applied, from the target document by analyzing one or more rendering commands for each object included in the target document, and generating print data by inserting transparency information into pixel data corresponding to the detected transparency region; and transmitting the generated print data to the image forming apparatus.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The above and/or other aspects will be more apparent by describing certain exemplary embodiments with reference to the accompanying drawings, in which:

FIG. 4 is a diagram showing an example of rendering commands for creating the document illustrated in FIG. 3A;

FIG. 5 is a diagram showing an example of rendering commands for creating the document illustrated in FIG. 3B;

FIGS. 9 and 10 are diagrams illustrating the configuration of pixel data, according to an exemplary embodiment;

FIG. 12 is a diagram illustrating an example of a PJL command, according to an exemplary embodiment;

DETAILED DESCRIPTION

Figure 1:
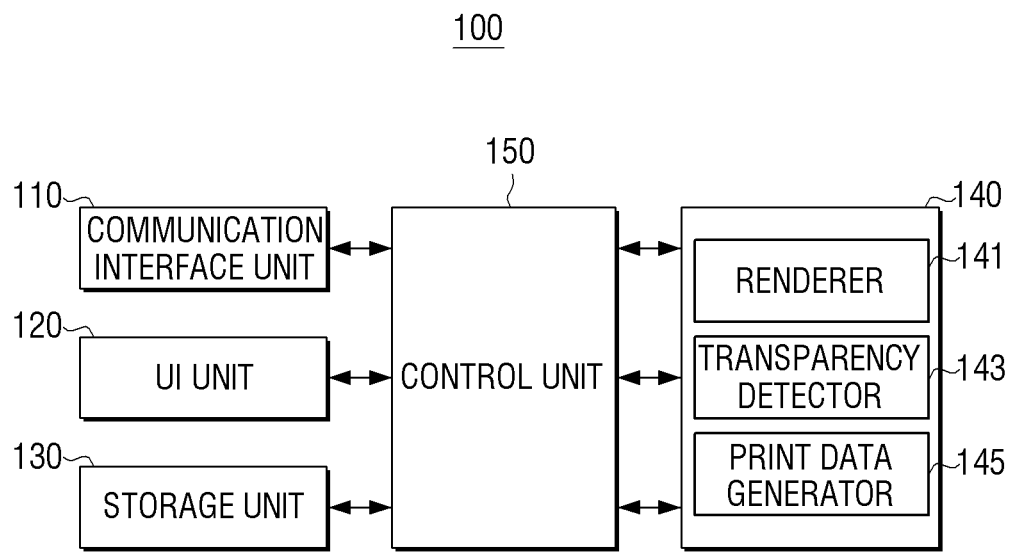
FIG. 1 is a block diagram illustrating a print control terminal device, according to an exemplary embodiment.

Certain exemplary embodiments will now be described in greater detail with reference to the accompanying drawings.

In the following description, the same drawing reference numerals are used for the same elements even in different drawings. The matters defined in the description, such as detailed construction and elements, are provided to assist in a comprehensive understanding of the exemplary embodiments. Thus, it is apparent that the exemplary embodiments can be carried out without those specifically defined matters. Additionally, well-known functions or constructions are not described in detail since they would obscure the exemplary embodiments with unnecessary detail.

FIG. 1 is a block diagram illustrating a print control terminal device 100, according to an exemplary embodiment.

Referring to FIG. 1, the print control terminal device 100 includes a communication interface unit 110, a User Interface (UI) unit 120, a storage unit 130, a printer driver unit 140, and a control unit 150.

The communication interface unit 110 may be connected to an image forming apparatus 200, and may provide the image forming apparatus 200 with print data that may be processed by the image forming apparatus 200 and print options.

For example, the print data that may be processed by the image forming apparatus 200 may include Page Description Language (PDL) data written in a Printer Command Language (PCL) or a PostScript (PS) language.

The communication interface unit 110 may connect the print control terminal device 100 to an external device. For example, the communication interface unit 110 may be implemented as a parallel port, a Universal Serial Bus (USB) port, a wireless port, or the like. Information such as the print options and transparency information may be transmitted to the image forming apparatus 200 in the form of a Printer Job Language (PJL) command.

The UI unit 120 may include a plurality of function keys to allow a user to make a setting or selection regarding various functions supported by the print control terminal device 100, and may display various information provided by the print control terminal device 100. For example, the UI unit 120 may be implemented as a device capable of realizing both input and output functions, such as a touch pad or the like or may be implemented as the combination of a mouse and a monitor. The UI unit 120 may display a document that can be outputted. Accordingly, the user may select a document to be printed and set print options for the selected document by using an interface window provided by the UI unit 120.

The UI unit 120 may receive a selection regarding a "Transparency Enhance" option 1111 from the user. For example, referring to FIG. 11, the UI unit 120 may display a UI window 1100, and may receive a selection regarding the "Transparency Enhance" option 1111 from the user via the UI window 1100. The "Transparency Enhance" option 1111 may be a print option for determining whether transparency is applied to a document and for printing the document by applying an algorithm for preventing any degradation in picture quality that may result from the application of transparency. In response to the selection of the "Transparency Enhance" option 1111 by the user, a transparency region detection operation region may be performed. For example, the transparency region detection operation may be performed only when the "Transparency Enhance" option 1111 is selected. Alternatively, the transparency region detection operation may also be performed when the "Transparency Enhance" 1111 option is not selected.

The storage unit 130 may store a document. The term "document" may indicate, but is not limited to, data written by various word processor application programs. The storage unit 130 may also store print data. For example, the storage unit 130 may temporarily store print data that is generated by the printer driver unit 140. The storage unit 130 may include an output buffer (not shown). The output buffer may store print data rendered by the printer driver unit 140, and may correspond to a print page size.

The storage unit 130 may also store one or more transparency patterns. The term "transparency pattern" may indicate, but is not limited to, a pattern used to apply transparency. For example, the storage unit 130 may store a plurality of transparency patterns corresponding to different transparency levels ranging from 1% to 99%. For example, the storage unit 130 may be implemented not only as an internal storage medium of the print control terminal device 100 but also as an external storage medium, a removable disk (such as a USB memory), or a web server.

The printer driver unit 140 may detect a transparency region, which is a region to which transparency is applied, by analyzing a rendering command for each of a plurality of objects included in a document, and may generate print data by inserting transparency information into pixel data of the detected transparency region.

The printer driver unit 140 may include a renderer 141, a transparency detector 143, and a print data generator 145.

The renderer 141 may perform rendering based on an ROP command for each object included in a document. For example, the renderer 141 may receive object information such as "Brush," "Text," "Image," "Stroke," "Line," "ROP," and coordinates from a Graphics Device Interface (GDI) of an Operating System (OS) of the print control terminal device 100, and may perform rendering based on rendering commands, which are included in the received object information.

In response to the receipt of a predefined set of rendering commands for a particular region in a target document, the transparency detector 143 may detect the particular region as a transparency region. For example, if an XOR RENDERING command, an AND rendering command, and an XOR RENDERING command that designate the particular region are sequentially received, the transparency detector 143 may detect the particular region as a transparency region.

The operation of the transparency detector 143 will be described later in further detail with reference to FIG. 15.

The print data generator 145 may generate print data by inserting transparency information into pixel data of a transparency region detected by the transparency detector 143. For example, the print data generator 145 may generate rendered data as print data. The print data generator 145 may insert transparency information into the value of each pixel within the detected transparency region. For example, the print data generated by the print data generator 145 may be PDL data written in the PCL or the PS language.

Rendering may be performed by the print control terminal device 100 or by the image forming apparatus 200. In a case in which the print control terminal device 100 does not perform rendering, the printer driver unit 140 may generate print data simply by converting object information that is received from the GDI into a language that can be recognized by the image forming apparatus 200, and may notify the image forming apparatus 200 of the presence and location of any transparency region by using a PJL command. The printer driver unit 140 may also notify the image forming apparatus 200 of information indicating a transparency scale that is applied during a rendering operation.

The control unit 150 may control the communication interface unit 110, the UI unit 120, the storage unit, and the printer driver unit 140. For example, in response to the receipt of a print command via the UI unit 120, the control unit 150 may control the UI unit 120 to display a UI window for receiving selections regarding print options for the target document. The control unit 150 may detect any transparency region from the target document. In a case in which there exists a transparency region in the target document, the control unit 150 may control the printer driver unit 140 to generate print data including transparency information.

The control unit 150 may control the communication interface unit 110 to transmit the print data generated by the printer driver unit 140 to the image forming apparatus 200. The control unit 150 may control the storage unit 130 to store the print data generated by the printer driver unit 140 in case the user wishes to output the target document more than one time.

The print control terminal device 100 may analyze a RENDERING command for each object in a document and may determine whether the document includes any transparency object based on the results of the analysis.

Figure 2:
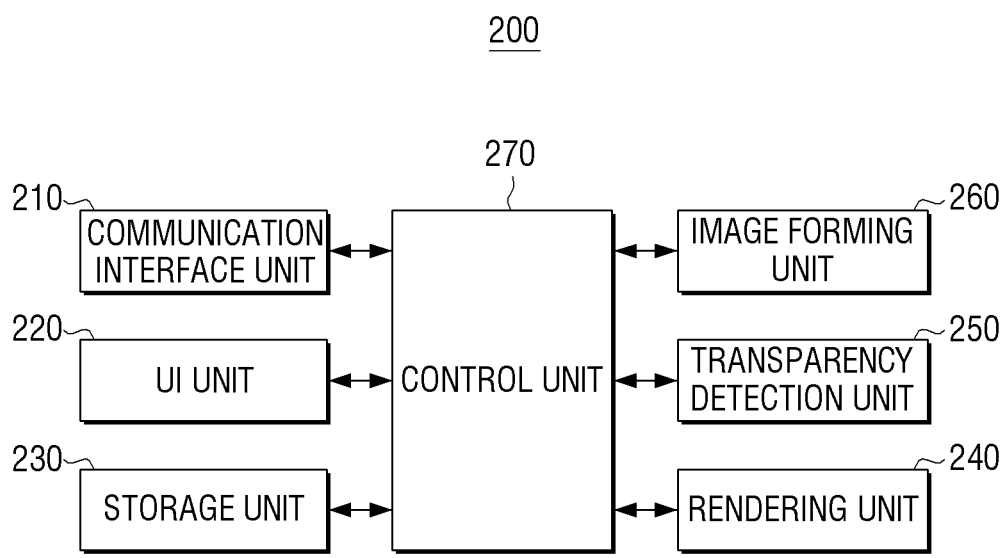
FIG. 2 is a block diagram illustrating an image forming apparatus, according to an exemplary embodiment.

FIG. 2 is a block diagram illustrating an image forming apparatus 200, according to an exemplary embodiment.

Referring to FIG. 2, the image forming apparatus 200 includes a communication interface unit 210, a UI unit 220, a storage unit 230, a rendering unit 240, a transparency detection unit 250, an image forming unit 260, and a control unit 270.

The communication interface unit 210 may be connected to the print control terminal device 100 or a typical print control terminal device, and may receive input print data or input print options from the connected print control terminal device. The communication interface unit 210 may connect the image forming apparatus 200 to an external device. For example, the communication interface unit 210 may be implemented as a parallel port, a USB port, a wireless port, or the like. In the example illustrated in FIG. 2, the input print data and the input print options may be separately received. In another non-limiting example, print data including print options may be received.

The input print data, which is received by the communication interface unit 210 may be print data into which transparency information is inserted by the print control terminal device 100, or may be print data with no transparency information, provided by a typical print control terminal device.

The UI unit 220 may include a plurality of function keys to allow a user to make a setting or selection regarding various functions supported by the image forming apparatus 200, and may display various information provided by the image forming apparatus 200. For example, the UI unit 220 may be implemented as a device capable of realizing both input and output functions, such as, a touch pad or the like or may be implemented as the combination of a mouse and a monitor.

The UI unit 220 may receive a selection regarding a "Transparency Enhance" option 1111 from the user. For example, the UI unit 220 may display a UI window, and may receive a selection regarding the "Transparency Enhance" option 1111 from the user via the UI window. The "Transparency Enhance" option 1111 may be a print option for determining whether transparency is applied to a document and for printing the document by applying an algorithm for preventing any degradation in picture quality that may result from the application of transparency. In response to the selection of the "Transparency Enhance" option 1111 by the user, a transparency region detection operation may be performed, or a predefined algorithm may be applied.

The storage unit 230 may store the input print data. For example, the storage unit 230 may store the print data, which is received by the communication interface unit 210. The storage unit 230 may also store rendered print data provided by the rendering unit 240. The storage unit 230 may also store half-toned print data provided by the image forming unit 260. Half-toning refers to a process of converting a multi-level image into a binary image. Since the quality of a document may vary depending on the type of half-toning performed on the document, the storage unit 230 may store various half-toning masks.

The storage unit 230 may store one or more transparency patterns. The term "transparency pattern" may indicate, but is not limited to, a pattern used to apply transparency. For example, the storage unit 230 may store a plurality of transparency patterns corresponding to different transparency levels ranging from 1% to 99%.

For example, the storage unit 230 may store a lookup table showing the correspondence between a plurality of transparency patterns and a plurality of half-toning screen patterns. For example, a developer may create a lookup table showing a transparency pattern that is determined not to cause any picture quality degradation for each half-toning screen available, and may store the created lookup table in the storage unit 230 in advance.

The rendering unit 240 may perform rendering on each object included in the input print data based on one or more rendering commands. For example, the rendering unit 240 may perform rendering on each object included in the input print data, which is received by the communication interface unit 210 based on one or more rendering commands for a corresponding object.

Rendering may also be performed by the print control terminal device 100. In this example, the input print data may be rendered print data, and thus, the image forming apparatus 200 may not perform rendering on the input print data.

In response to the receipt of a predefined combination of rendering commands for a particular region in a target document, the transparency detection unit 250 may detect the particular region as a transparency region. For example, if an XOR rendering command, an AND rendering command, and an XOR rendering command that designate the particular region are sequentially received, the transparency detection unit 250 may detect the particular region as a transparency region. The operation of the transparency detection unit 250 will be described later in further detail with reference to FIG. 15.

A transparency region detection operation may also be performed by the print control terminal device 100. Accordingly, in response to the receipt of print data including transparency information, the transparency detection unit 250 may determine the presence of any objects with transparency based on the transparency information, and may detect a transparency region by locating one or more pixels with the transparency information.

The image forming unit 260 may print rendered print data by applying a predefined picture quality improving algorithm. For example, in a case in which it is determined that transparency is applied to the input print data, the image forming unit 260 may half-tone rendered print data, which is obtained by performing rendering on the input print data, by applying the predefined algorithm, and may print the half-toned rendered print data. For example, the predefined algorithm may be an algorithm for performing half-toning by using a half-toning screen that is selected from the lookup table present in the storage unit 230 and corresponds to a transparency multiple number applied to the transparency region in the input print data. In this example, the picture quality of a transparency region may be improved by using a particular half-toning screen. Alternatively, various other algorithms may be used to improve the picture quality of a transparency region.

The control unit 270 may control the communication interface unit 210, the UI unit 220, the storage unit 230, the rendering unit 240, the transparency detection unit 250, and the image forming unit 260. For example, the control unit 270 may determine whether the input print data, which is received by the communication interface unit 210, is rendered print data. If the input print data is rendered print data, the control unit 270 may determine whether the input print data includes transparency information. If the input print data includes transparency information, the control unit 270 may control the image forming unit 260 to print the input print data based on the transparency information of the input print data in accordance with a predefined picture quality improving algorithm.

Alternatively, if the input print data is not rendered print data, the control unit 270 may control the rendering unit 240 to perform rendering on the input print data, and may control the transparency detection unit 250 to detect any transparency region from the rendered input print data. If a transparency region is detected from the rendered input print data, the control unit 270 may control the image forming unit 260 to print the rendered input print data based on the transparency information of the input print data in accordance with a predefined picture quality improving algorithm.

As described above, the image forming apparatus 200 may improve the picture quality of an image by detecting a transparency region, if any, from input print data and printing the input print data while applying a predefined picture quality improving algorithm to the input print data.

Figure 3A:
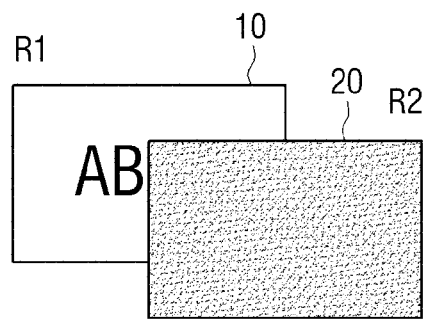
FIGS. 3A and 3B are diagrams illustrating examples of a document that may be created by a user.
Figure 3B:
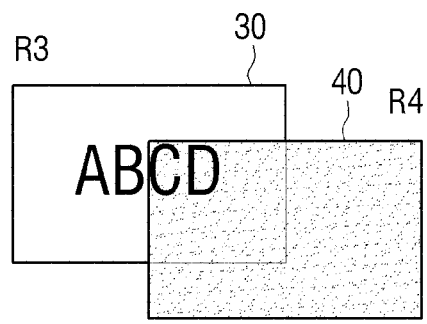
Figure 6:
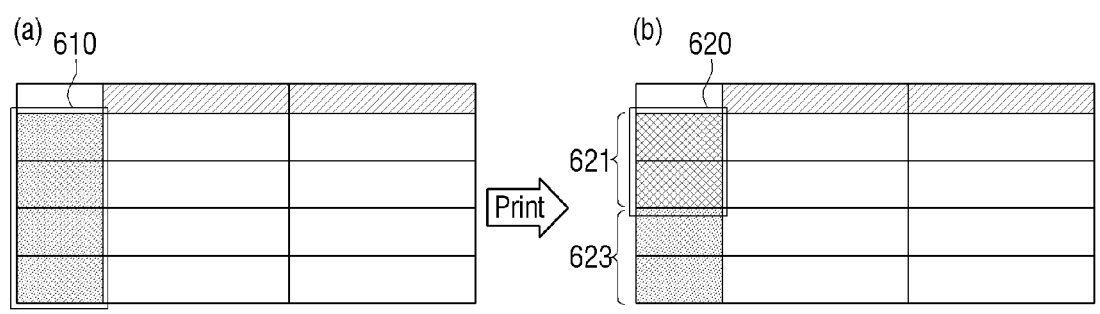
FIGS. 6, 7A and 7B are diagrams illustrating an example of a degradation in picture quality that may result from the application of transparency.
Figure 7A:
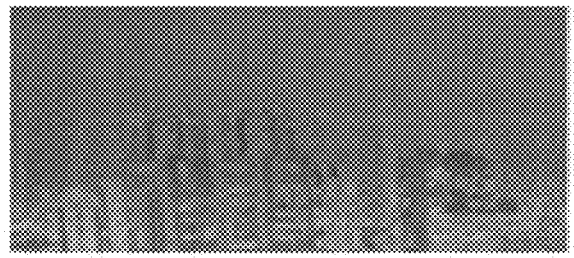
Figure 7B:
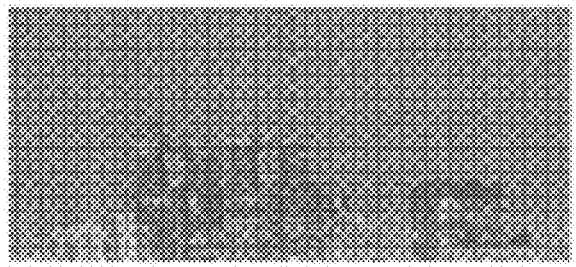

FIGS. 3A and 3B are diagrams illustrating examples of a document that may be created by a user. More specifically, FIG. 3A illustrates an example of a document with no transparency, and FIG. 3B illustrates an example of a document with transparency.

Referring to FIG. 3A, a user may draw rectangular object R1 (10) and may then draw rectangular object R2 (20) over rectangular object R1 (10). Rendering commands for creating the document illustrated in FIG. 3A are as shown in FIG. 4. Alternatively, the user may draw rectangular object R4 (40) over rectangular object R3 by applying transparency to rectangular object R4 (40). Rendering commands for creating the document illustrated in FIG. 3B are as shown in FIG. 5.

FIG. 4 is a diagram showing an example of rendering commands for creating the document illustrated in FIG. 3A.

Referring to FIG. 4, the renderer 141 illustrated in FIG. 1 may record a rectangle brushed with blue in an output buffer based on rendering commands 1.1 to 1.3, and may record a rectangle brushed with yellow in the output buffer based on rendering commands 1.4 to 1.6. In this example, the overlapping area between the two rectangles may be brushed with yellow, which is the last previous brush color. Accordingly, the overlapping area between the two rectangles may be printed in yellow.

FIG. 5 is a diagram showing an example of rendering commands for creating the document illustrated in FIG. 3B.

Referring to FIG. 5, the renderer 141 the renderer 141 illustrated in FIG. 1 may record a rectangle brushed with blue in an output buffer based on rendering commands 2.1 to 2.3. Rendering for object R3 (30) may be performed in the same manner as rendering for object R1 (10) as described above with reference FIG. 4. However, since object R4 (40), unlike object R2 (20), is an object with transparency, a set of rendering commands for object R4 (40) that differs from the set of rendering commands for object R2 (20) may be transmitted. For example, to display an object with transparency, i.e., object R4 (40), rendering commands 2.4 to 2.12, instead of rendering commands 1.4 to 1.6 of FIG. 4, may be executed so that object R4 (40) may be drawn in the same size and location as object R2 (20), but with transparency, unlike object R2 (20). Accordingly, referring to FIG. 3B, object R4 (40) may be rendered over object R3 (30) with a transparency effect so that object R3 (30) may be seen through object R4 (40). During the processing of rendering commands 2.4 to 2.12, an object field may be transformed into graphics by rendering command 2.6, may be transformed into a pattern brush by rendering command 2.9, and may be transformed back into graphics by rendering command 2.12.

As described above with reference to FIGS. 4 and 5, transparency may be defined not by a single ROP command but by a combination of ROP commands.

In view of the examples illustrated in FIGS. 4 and 5, a region to which an XOR rendering command, an AND rendering command, and an XOR rendering command are sequentially applied may be determined as a transparency region.

Accordingly, the transparency detector 143 illustrated in FIG. 1 or the transparency detection unit 250 illustrated in FIG. 2 may detect a region for which an XOR rendering command, an AND rendering command, and an XOR rendering command are sequentially input as a transparency region. The operation of the transparency detector 143 illustrated in FIG. 1 or the transparency detection unit 250 illustrated in FIG. 2 may be implemented as an algorithm illustrated in FIG. 15.

Figure 9:
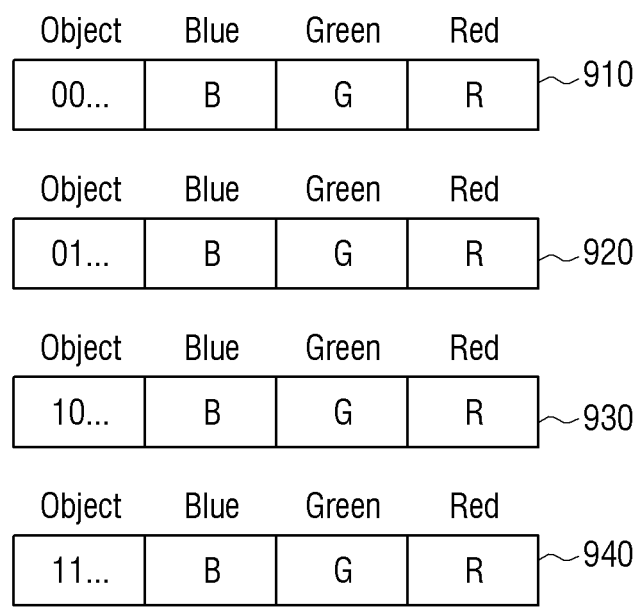

The results of the detection of a transparency region may be reflected into pixel data, as illustrated in FIG. 9. In this manner, the image forming apparatus 200 may detect a predefined area in input pixel data, and may thus easily detect the presence of any transparency region based on the detected predefined area.

Figure 8:
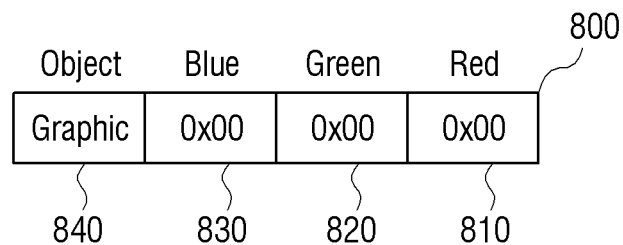
FIG. 8 is a diagram illustrating an example of the configuration of related-art pixel data.

FIG. 8 is a diagram illustrating the configuration of related-art pixel data.

Referring to FIG. 8, the related-art pixel data (or a pixel value) includes a first field 810 representing a red (R) value, a second field 820 representing a green (G) value, a third field 830 representing a blue (B) value, and a fourth field 840 representing object attribute information. The fourth field 840 may be 1 byte long, and may thus be able to represent a total of 256 types of objects. However, conventionally, only about twenty types of objects may be represented by the fourth field 840.

For example, a fourth field of pixel data may be divided into two sub-fields, i.e., a first sub-field, which is six bits long, and a second sub-field, which is two bits long. In this example, the first sub-field may be used to indicate object attribute information of the pixel data, and the second sub-field may be used to indicate whether the pixel data corresponds to a transparency object. This example will hereinafter be described in further detail with reference to FIGS. 9 and 10.

FIGS. 9 and 10 are diagrams illustrating the configuration of pixel data, according to an exemplary embodiment.

Referring to FIG. 9, pixel data (or a single pixel value) may include a first field representing an R value, a second field representing a G value, a third field representing a B value, and a fourth field representing object attribute information. The fourth field may include a first sub-field indicating the object type of the pixel data and a second sub-field indicating whether the pixel data corresponds to a transparency object. In response to the receipt of pixel data illustrated in FIG. 10, the transparency detection unit illustrated in FIG. 2 may easily determine whether the pixel data corresponds to a transparency object by determining whether the two most significant bits (MSBs) of the fourth field is "11."

Figure 11:
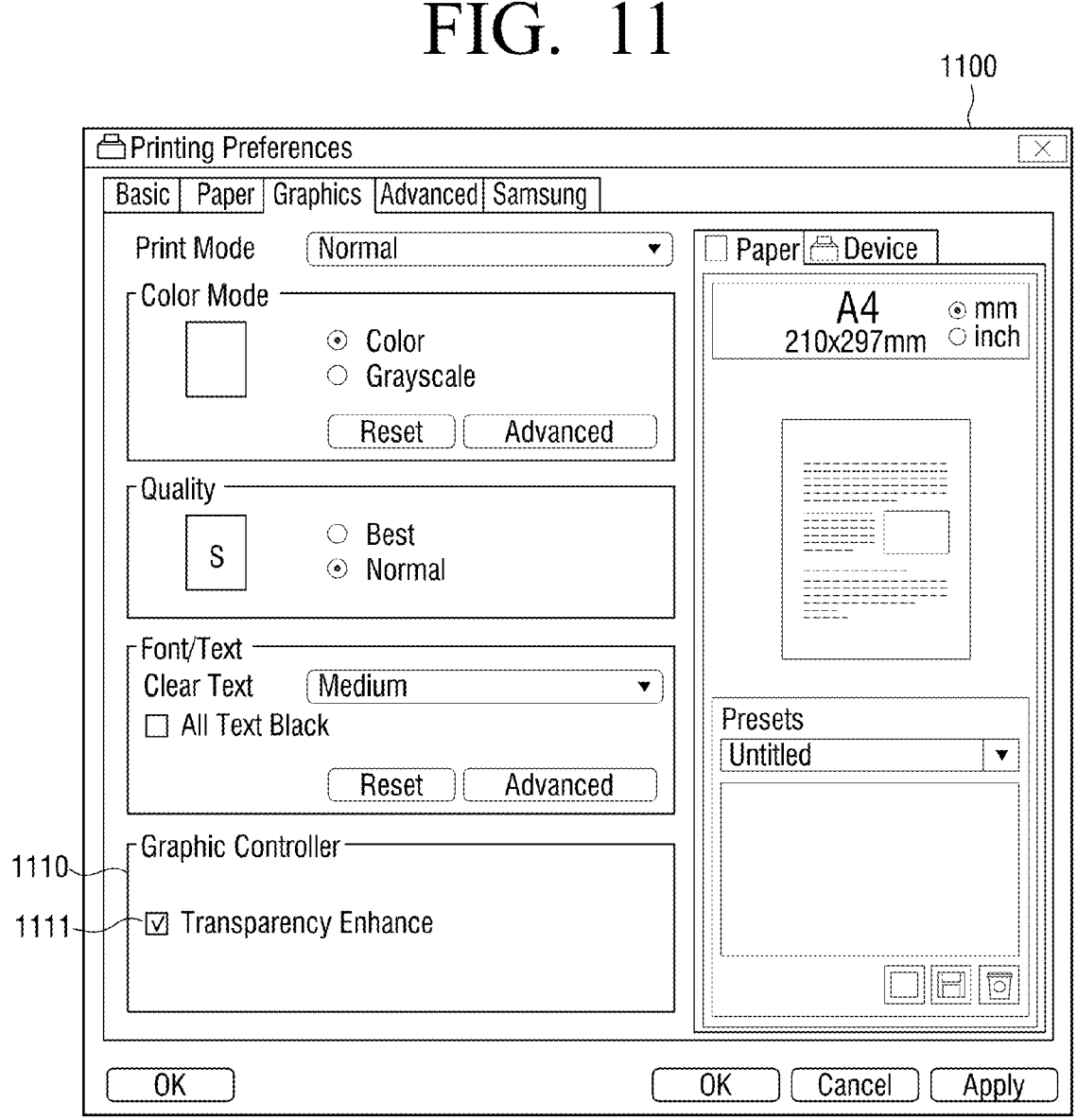
FIG. 11 is a diagram illustrating an example of a User Interface (UI) window that may be displayed by a UI unit illustrated in FIG. 1.

FIG. 11 is a diagram illustrating an example of a UI window 1100 that may be displayed by the UI unit 120 illustrated in FIG. 1.

Referring to FIG. 11, a UI window 1100 includes various areas for receiving settings regarding print options to be applied to a document. For example, the UI window 1100 may include an area 1110 for receiving a setting regarding a "Transparency Enhance" option 1111. In a case in which a user sets the "Transparency Enhance" option 1111 and the printer control terminal device 100 is configured to perform no rendering, PJL commands as shown in FIG. 12 may be transmitted from the printer control terminal device 100 to the image forming apparatus 200 so that various operations, including a transparency region detection operation, may be performed by the image forming apparatus 200.

Figure 13:
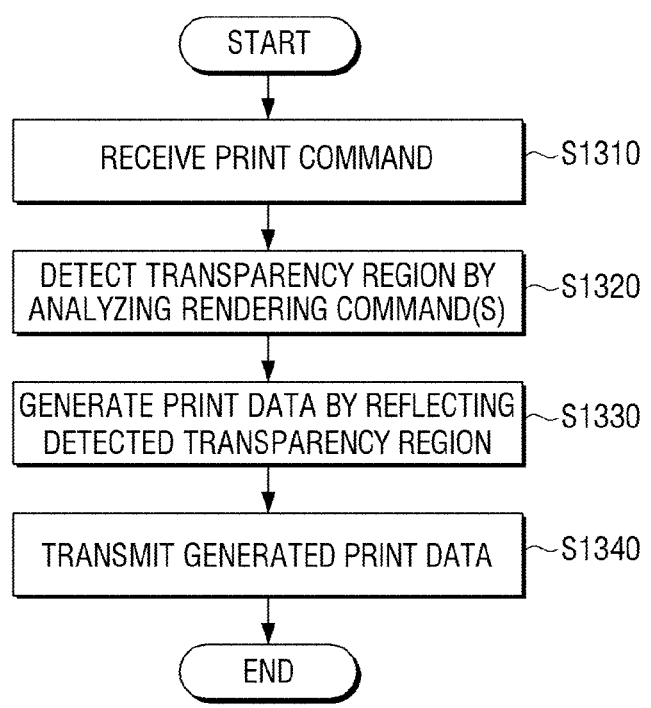
FIG. 13 is a flowchart illustrating a print control method, according to an exemplary embodiment.

FIG. 13 is a flowchart illustrating a print control method, according to an exemplary embodiment.

Referring to FIG. 13, in operation S1310, a print command may be received. In operation S1320, a set of rendering commands for each object included in a target object may be analyzed, and a transparency region may be detected from the target object based on the results of the analysis. For example, object information (for example, object information such as "Brush," "Text," "Image," "Stroke," "Line," "ROP," and coordinates may be received from a GDI of an OS of a print control terminal device, and rendering may be performed based on rendering commands, which are included in the received object information. For example, a region for which an XOR rendering command, an AND rendering command, and an XOR rendering command are sequentially input may be detected from the target document as the transparency region.

In operation S1330, print data may be generated by inserting transparency information into pixel data of the detected transparency region. For example, the transparency information may be inserted into the pixel data of the detected transparency region, and the resulting rendered data with the transparency information inserted thereinto may be generated as print data.

In operation S1340, the generated print data may be transmitted to an image forming apparatus. The generated print data may be stored in case that the target document is output repeatedly.

According to the example illustrated in FIG. 13, it is possible to determine whether a target document includes any transparency object by analyzing a set of rendering commands for each object included in the target object. The example illustrated in FIG. 13 may be performed in the print control terminal device 100 illustrated in FIG. 1 or another print control terminal device having a different structure from the print control terminal device 100.

The example illustrated in FIG. 13 may be implemented as one or more programs or program instructions that may be recorded on a computer-readable recording medium.

The non-transitory computer-readable recording medium may be a device that can store data that is readable by a computer system.

Figure 14:
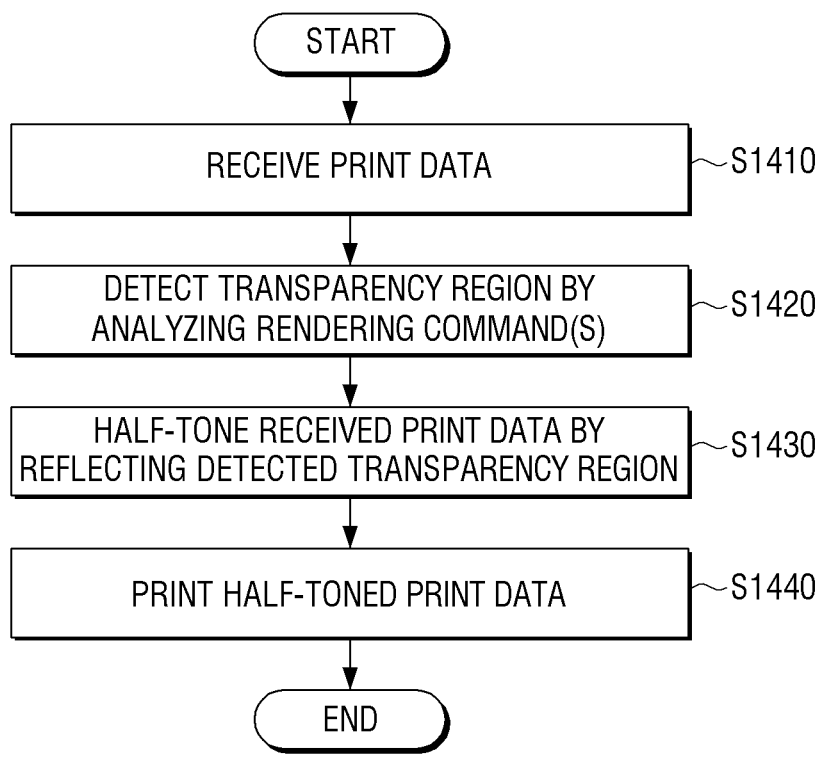
FIG. 14 is a flowchart illustrating a print control method, according to an exemplary embodiment.

FIG. 14 is a flowchart illustrating a print control method, according to another exemplary embodiment.

Referring to FIG. 14, in operation S1410, print data may be received.

In operation S1420, rendering may be performed based on a plurality of sets of rendering commands for a plurality of objects included in the received print data, and a region for which a predefined combination of rendering commands is input may be detected from the received print data as a transparency region. For example, the received print data may be rendered based on an ROP command for each of the objects included in the received print data, and in response to the receipt of an XOR rendering command, an AND rendering command, and an XOR rendering command that designate a particular region, the particular region may be detected as the transparency region.

In operation S1430, the rendered print data may be half-toned by applying a predefined picture quality improving algorithm to the detected transparency region. For example, if it is determined that transparency has been applied to the received print data, the rendered print data may be half-toned by applying the predefined picture quality improving algorithm. For example, the predefined picture quality improving algorithm may be an algorithm for performing half-toning by using a half-toning screen that is selected from the lookup table present in the storage unit 230 illustrated in FIG. 2 and corresponds to a transparency multiple number applied to the detected transparency region.

In operation S1440, the half-toned print data may be printed.

According to the example illustrated in FIG. 14, it is possible to improve the quality of an output image by detecting any transparency region in received print data and printing the received print data while applying a picture quality improving algorithm in response to the detection of a transparency region from the received print data. The example illustrated in FIG. 14 may be performed by the image forming apparatus 200 illustrated in FIG. 2 or another image forming apparatus having a different structure from the image forming apparatus 200.

Figure 15:
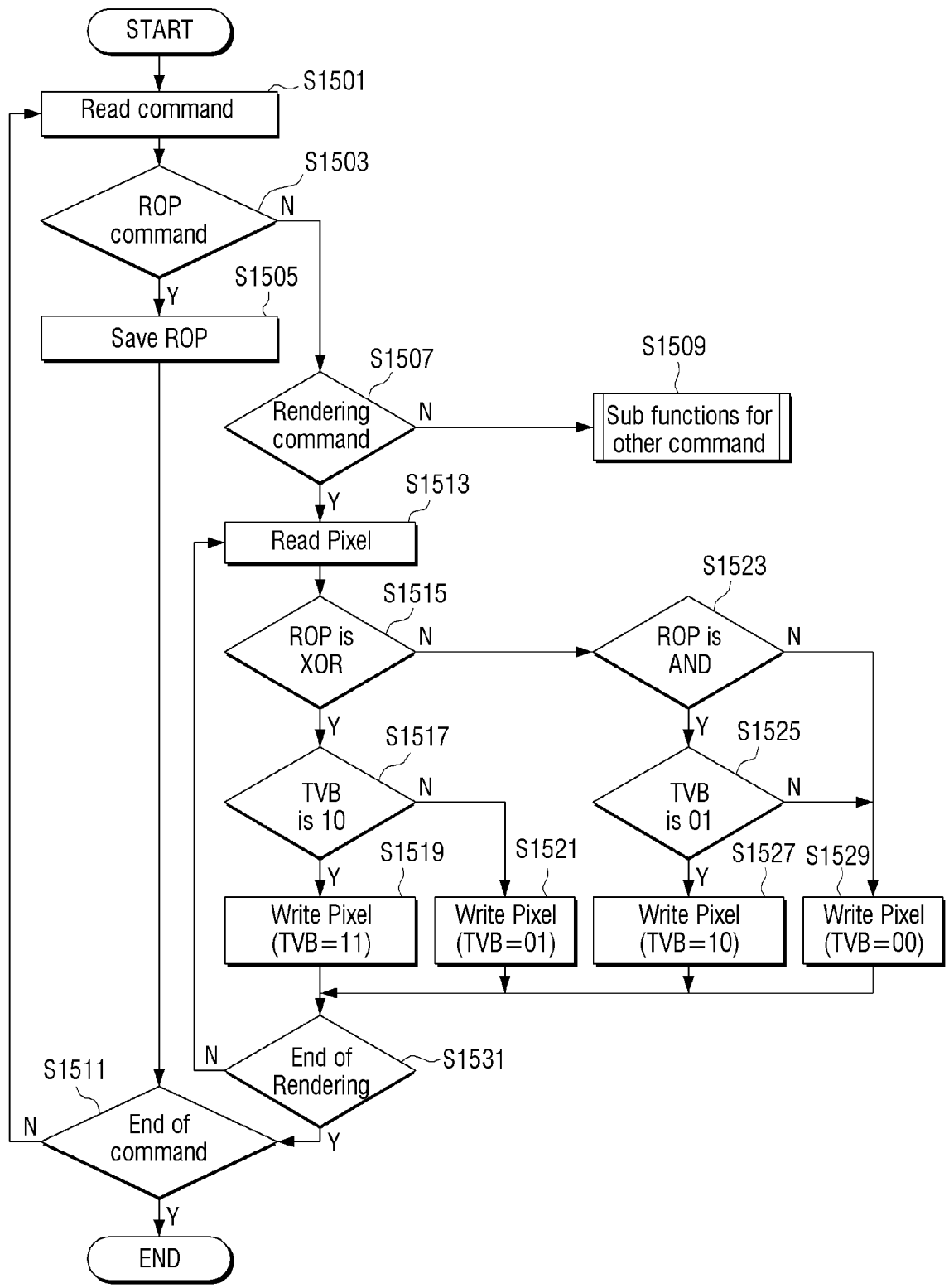
FIG. 15 is a flowchart illustrating detecting a transparency region as performed in the print control method illustrated in FIG. 13 or 14, according to an exemplary embodiment.
Figure 16:
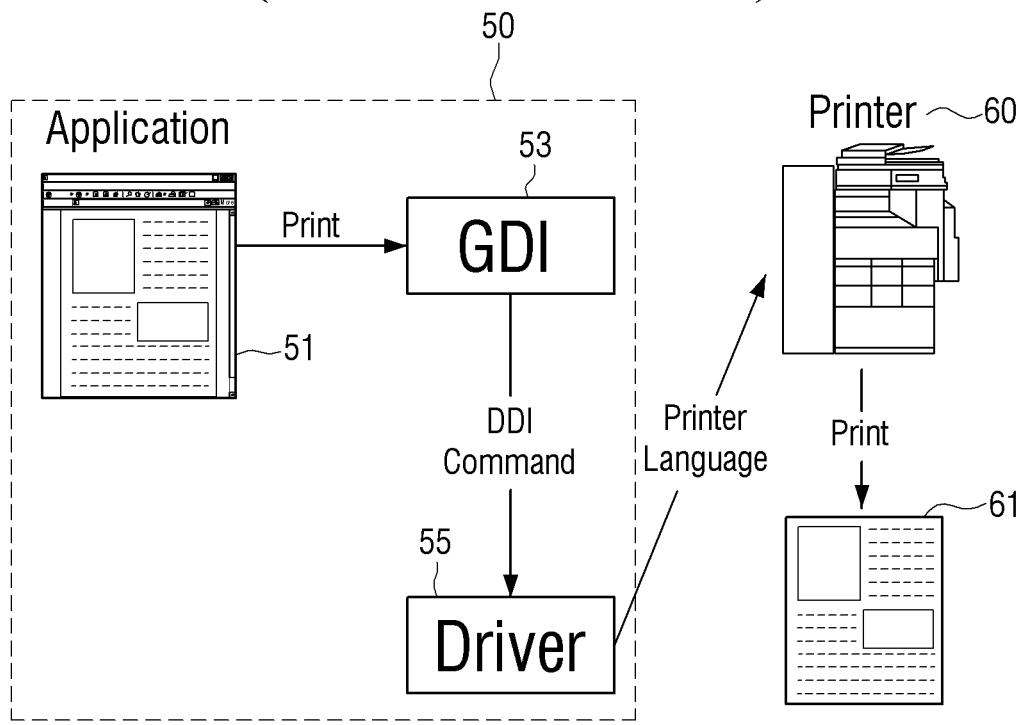
FIG. 16 is a diagram illustrating a related-art print process.

FIG. 15 is a flowchart illustrating a method of detecting a transparency region as performed in the print control method illustrated in FIG. 13 or 14, according to an exemplary embodiment.

Referring to FIG. 15, in operation S1501, an input command may be read. For example, in a case in which a print control terminal device is configured to detect transparency, the input command may be transmitted by a GDI. Alternatively, in a case in which an image forming apparatus is configured to detect transparency, the input command may be a command translated into a language that can be recognized by the image forming apparatus.

In operation S1503, a determination may be made as to whether the input command is an ROP command. In accordance with the "Y" result of operation S1503, in operation S1505, the input command may be stored.

Alternatively, in accordance with the "N" result of operation S1503, in operation S1507, a determination may be made as to whether the input command is a rendering command, i.e., a command such as "Draw Rectangle," "draw font," "Draw Image," "Draw Line," or the like that results in pixel writing.

In accordance with the "N" result of operation S1507, for example, in a case in which the input command is a command designating the coordinates of a target pixel to be rendered, a "brush" command, or a "clip" command, in operation S1509, the input command may be processed accordingly.

Alternatively, in accordance with the "Y" result of operation S1507, in operation S1513, the value of the target pixel may be read.

In operation S1515, a determination may be made as to whether the input command is an XOR rendering command. In accordance with the "Y" result of operation S1515, in operation S1517, a determination may be made as to whether the value of the target pixel includes information (for example, "10") indicating that an XOR rendering command and an AND rendering command have been sequentially executed on the target pixel. In accordance with the "Y" result of operation S1517, in operation S1519, information (for example, "11") indicating that the target pixel corresponds to a transparency object may be added to the value of the target pixel. Alternatively, in accordance with the "N" result of operation S1517, in operation S1521, information indicating that an XOR rendering command has been executed on the target pixel may be added to the value of the target pixel.

In accordance with the "N" result of operation S1515, in operation S1523, a determination may be made as to whether the input command is an AND rendering command. In accordance with the "Y" result of operation S1523, in operation S1525, a determination may be made as to whether an XOR rendering command has been executed on the target pixel. In accordance with the "Y" result of operation S1525, in operation S1527, information indicating that an XOR rendering command and an AND rendering command have been sequentially executed on the target pixel may be added to the value of the target pixel.

Alternatively, in accordance with the "N" result of operation S1525, in operation S1529, information indicating that a predefined combination of rendering commands has not yet been executed on the target pixel may be added to the value of the target pixel.

In operation S1531, a determination may be made as to whether the rendering of the target pixel is complete. In accordance with the "Y" result of operation S1531, in operation S1511, a determination may be made as to whether the processing of a series of commands including the input command is complete. Alternatively, in accordance with the "N" result of operation S1531, the method returns to operation S1513. In accordance with the "Y" result of operation S1511, the method ends. Alternatively, in accordance with the "N" result of operation S1511, the method returns to operation S1501.

In the above-mentioned exemplary embodiments, in a case in which an XOR rendering command, an AND rendering command, and an XOR rendering command that designate a particular region are sequentially input, the particular region may be detected as a transparency region. Alternatively, the presence of a transparency region may also be detected based on other combinations of rendering commands, for example, a combination of AND, OR, and NOT rendering commands.

The foregoing exemplary embodiments and advantages are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A print control terminal device which is connected to an image forming apparatus, the print control terminal device comprising:
    a User Interface (UI) unit to receive a print command for a target document;

a printer driver unit to detect a transparency region, which is a region to which transparency is applied, from the target document by analyzing one or more rendering commands for each object included in the target document, and generate print data by inserting transparency information into pixel data corresponding to the detected transparency region; and a communication interface unit to transmit the generated print data to the image forming apparatus.

2. The print control terminal device of claim 1, wherein the printer driver unit comprises:

a renderer to perform rendering based on the one or more rendering commands;

a transparency detector to detect a region for which a predefined combination of rendering commands is input as the transparency region; and a print data generator to generate the print data by inserting the transparency information into pixel data corresponding to the detected region.

3. The print control terminal device of claim 2, wherein the transparency detector detects a region for which an XOR rendering command, an AND rendering command, and an XOR rendering command are sequentially inputted as the transparency region.

4. The print control terminal device of claim 1, wherein:

when an input XOR rendering command is received during a rendering operation for a target pixel and a value of the target pixel includes information indicating that an XOR rendering command and an AND rendering command have been sequentially executed on the target pixel, the print driver unit adds information indicating that the target pixel corresponds to a transparency object to the value of the target pixel;

when the input XOR rendering command is received during the rendering operation for a target pixel and the value of the target pixel does not include the information indicating that an XOR rendering command and an AND rendering command have been sequentially executed on the target pixel, the print driver unit adds information indicating that the input XOR rendering command has been executed on the target pixel to the value of the target pixel;

when an input AND rendering command is received during the rendering operation for the target pixel and the value of the target pixel includes information indicating that an XOR rendering command has been executed on the target pixel, the print driver unit adds information indicating that an XOR rendering command and the input AND rendering command have been executed on the target pixel to the value of the target pixel;

when the input AND rendering command is received during the rendering operation for the target pixel and the value of the target pixel does not include the information indicating that an XOR rendering command has been executed on the target pixel, the print driver unit adds information indicating that a predefined combination of rendering commands has not yet been executed on the target pixel to the value of the target pixel; and when a rendering command other than an XOR rendering command and an AND rendering command is received during the rendering operation for the target pixel, the print driver unit adds the information indicating that the predefined combination of rendering commands has not yet been executed on the target pixel to the value of the target pixel.

5. The print control terminal device of claim 1, wherein the value of the target pixel comprises a first field representing a red (R) value, a second field representing a green (G) value, a third field representing a blue (B) value, and a fourth field representing object attribute information, and the fourth field comprises a sub-field indicating whether the target pixel corresponds to a transparency object.

6. The print control terminal device of claim 5, wherein the fourth field comprises a sub-field which is six bits long and indicates an object type corresponding to the target pixel and a sub-field which is two bits long and indicates whether the target pixel corresponds to a transparency object.

7. The print control terminal device of claim 1, wherein, when the generated print data has transparency, the communication interface unit transmits information indicating the presence of transparency in the generated print data to the image forming apparatus as a Printer Job Language (PJL) command.

8. An image forming apparatus which is connected to a print control terminal device, the image forming apparatus comprising:

a communication interface unit to receive print data;

a rendering unit to render the received print data based on one or more rendering commands for each object included in the received print data;

a transparency detection unit to detect a region for which a predefined combination of rendering commands is inputted from the rendered print data as a transparency region; and an image forming unit to print the rendered print data by applying a predefined picture quality improving algorithm to the detected transparency region.

9. The image forming apparatus of claim 8, wherein the transparency detection unit detects a region for which an XOR rendering command, an AND rendering command, and an XOR rendering command are sequentially inputted as the transparency region.

10. The image forming apparatus of claim 8, wherein the picture quality improving algorithm is an algorithm for half-toning the rendered print data by using a half-toning screen corresponding to a transparency multiple number applied to the detected transparency region.

11. A print control method of a print control terminal device which is connected to an image forming apparatus, the print control method comprising:

receiving a print command for a target document;

detecting a transparency region, which is a region to which transparency is applied, from the target document by analyzing one or more rendering commands for each object included in the target document, and generating print data by inserting transparency information into pixel data corresponding to the detected transparency region; and transmitting the generated print data to the image forming apparatus.

12. The print control method of claim 11, wherein the generating the print data comprises:

performing rendering based on the one or more rendering commands;

detecting a region for which a predefined combination of rendering commands is input as the transparency region; and generating the print data by inserting the transparency information into pixel data corresponding to the detected region.

13. The print control method of claim 12, wherein the detecting the transparency region comprises detecting a region for which an XOR rendering command, an AND rendering command, and an XOR rendering command are sequentially inputted as the transparency region.

14. The print control method of claim 11, wherein the generating the print data comprises:

when an input XOR rendering command is received during a rendering operation for a target pixel and a value of the target pixel includes information indicating that an XOR rendering command and an AND rendering command have been sequentially executed on the target pixel, adding information indicating that the target pixel corresponds to a transparency object to the value of the target pixel;

when the input XOR rendering command is received during the rendering operation for a target pixel and the value of the target pixel does not include the information indicating that an XOR rendering command and an AND rendering command have been sequentially executed on the target pixel, adding information indicating that the input XOR rendering command has been executed on the target pixel to the value of the target pixel;

when an input AND rendering command is received during the rendering operation for the target pixel and the value of the target pixel includes information indicating that an XOR rendering command has been executed on the target pixel, adding information indicating that an XOR rendering command and the input AND rendering command have been executed on the target pixel to the value of the target pixel;

when the input AND rendering command is received during the rendering operation for the target pixel and the value of the target pixel does not include the information indicating that an XOR rendering command has been executed on the target pixel, adding information indicating that a predefined combination of rendering commands has not yet been executed on the target pixel to the value of the target pixel; and when a rendering command other than an XOR rendering command and an AND rendering command is received during the rendering operation for the target pixel, adding the information indicating that the predefined combination of rendering commands has not yet been executed on the target pixel to the value of the target pixel.

15. The print control method of claim 11, wherein the value of the target pixel comprises a first field representing a red (R) value, a second field representing a green (G) value, a third field representing a blue (B) value, and a fourth field representing object attribute information, and the fourth field comprises a sub-field indicating whether the target pixel corresponds to a transparency object.

16. The print control method of claim 15, wherein the fourth field comprises a sub-field which is six bits long and indicates an object type corresponding to the target pixel and a sub-field which is two bits long and indicates whether the target pixel corresponds to a transparency object.

17. The print control method of claim 11, wherein the transmitting the generated print data comprises, when the generated print data has transparency, transmitting information indicating the presence of transparency in the generated print data to the image forming apparatus as a Printer Job Language (PJL) command.

18. A print control method of an image forming apparatus which is connected to a print control terminal device, the print control method comprising:

receiving print data;

rendering the received print data based on one or more rendering commands for each object included in the received print data;

detecting a region for which a predefined combination of rendering commands is inputted from the received print data as a transparency region; and printing the rendered print data by applying a predefined picture quality improving algorithm to the detected transparency region.

19. The print control method of claim 18, wherein the detecting the transparency region comprises detecting a region for which an XOR rendering command, an AND rendering command, and an XOR rendering command are sequentially inputted as the transparency region.

20. The print control method of claim 18, wherein the picture quality improving algorithm is an algorithm for halftoning the rendered print data by using a half-toning screen corresponding to a transparency multiple number applied to the detected transparency region.

21. A non-transitory computer-readable recording medium having recorded thereon a program for executing a print control method of a print control terminal device which is connected to an image forming apparatus, the print control method comprising:

receiving a print command for a target document;

detecting a transparency region, which is a region to which transparency is applied, from the target document by analyzing one or more rendering commands for each object included in the target document, and generating print data by inserting transparency information into pixel data corresponding to the detected transparency region; and transmitting the generated print data to the image forming apparatus.

* * * * *